(12) United States Patent
Onosaka (10) Patent No.: US 12,113,461 B2
(45) Date of Patent: Oct. 8, 2024

(54) MOTOR CONTROL DEVICE AND MOTOR CONTROL METHOD

(71) Applicant: AISIN CORPORATION, Aichi (JP)

(72) Inventor: Naoki Onosaka, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 17/857,448

(22) Filed: Jul. 5, 2022

(65) Prior Publication Data

US 2023/0009889 A1 Jan. 12, 2023

(30) Foreign Application Priority Data

Jul. 6, 2021 (JP) ................................. 2021-112162

(51) Int. Cl.
*H02P 21/14* (2016.01)

(52) U.S. Cl.
CPC ................... *H02P 21/14* (2013.01)

(58) Field of Classification Search
CPC ......... H02P 21/14; H02P 21/04; H02P 29/024
See application file for complete search history.

(56) References Cited

U.S. PATENT DOCUMENTS

| 11,201,579 | B2* | 12/2021 | Coroban-Schramel ...................... G01R 31/343 |
| 2005/0258795 | A1* | 11/2005 | Choi ................... B29C 45/7666 318/625 |
| 2012/0209467 | A1* | 8/2012 | Kono ..................... B60L 3/0023 701/22 |
| 2019/0039460 | A1* | 2/2019 | Teramoto ................ H02P 27/08 |

FOREIGN PATENT DOCUMENTS

| CN | 108776306 A | * | 11/2018 | ........... G01R 31/343 |
| JP | 6-165521 A | | 6/1994 | |
| JP | 2006-258033 A | | 9/2006 | |
| JP | 2019140778 A | * | 8/2019 | |
| RU | 2011101449 A | * | 7/2012 | ......... A47L 15/0049 |

\* cited by examiner

*Primary Examiner* — Bickey Dhakal
(74) *Attorney, Agent, or Firm* — Sughrue Mion, PLLC (57) ABSTRACT

A motor control device is configured to execute vector control on driving of a three-phase motor according to a d axis current command and a q axis current command. The motor control device includes: a current detection unit configured to detect a current to be input to the three-phase motor; and a control unit configured to control driving of the three-phase motor. The control unit includes: a three-phase to two-phase conversion unit configured to acquire a q axis current value by converting a three-phase current input to the three-phase motor and detected by the current detection unit into a two-phase current; and a determination unit configured to determine that the three-phase motor is idling when the q axis current value is equal to or smaller than a determination threshold set in advance.

6 Claims, 5 Drawing Sheets

MOTOR CONTROL DEVICE AND MOTOR CONTROL METHOD

CROSS REFERENCE TO RELATED APPLICATIONS

This application is based on and claims priority under 35 U.S.C. § 119 to Japanese Patent Application 2021-112162, filed on Jul. 6, 2021, the entire content of which is incorporated herein by reference.

TECHNICAL FIELD

This disclosure relates to a motor control device and a motor control method.

BACKGROUND DISCUSSION

In the related art, an inverter device that drives an electric motor is known (for example, see JP H06-165521A (Reference 1)).

The inverter device described in Reference 1 operates the electric motor at a variable speed. In this inverter device, an electric motor current is measured by a current detector provided in a DC main circuit unit inside the inverter device. Then, when a preset time elapses in a state in which the measured electric motor current drops to a preset threshold (electric motor no-load current value), the electric motor is detected to be in a no-load operation state (idling state and shut-off operation state).

Here, in the inverter device described in Reference 1, the electric motor current is measured by the current detector provided in the DC main circuit unit inside the inverter device, and thus a power supply current output from a power supply is measured as the electric motor current. In this case, when a rotation speed of the electric motor is controlled to be constant, the power supply current is small when an input power supply voltage is large. Therefore, when the power supply voltage is large, the measured current value is small, and thus the measured current value falls below the threshold (electric motor no-load current value) for determining the no-load operation state even when the electric motor is not in the no-load operation state. Accordingly, when the power supply voltage is large, there is a problem that it is not possible to accurately determine whether the electric motor (three-phase motor) is in no-load operation (idling).

A need thus exists for a motor control device and a motor control method which are not susceptible to the drawback mentioned above.

SUMMARY

According to a first aspect of this disclosure, a motor control device configured to execute vector control on driving of a three-phase motor according to a d axis current command and a q axis current command includes: a current detection unit configured to detect a current to be input to the three-phase motor; and a control unit configured to control driving of the three-phase motor. The control unit includes: a three-phase to two-phase conversion unit configured to acquire a q axis current value by converting a three-phase current input to the three-phase motor and detected by the current detection unit into a two-phase current; and a determination unit configured to determine that the three-phase motor is idling when the q axis current value is equal to or smaller than a determination threshold set in advance. The term "idling" as used herein means driving of the three-phase motor in a no-load operation state.

According to a second aspect of this disclosure, a motor control method for executing vector control on driving of a three-phase motor according to a d axis current command and a q axis current command includes: a step of detecting a current to be input to the three-phase motor; a step of acquiring a q axis current value by converting a three-phase current to be input to the three-phase motor into a two-phase current; and a step of determining that the three-phase motor is idling when the q axis current value is equal to or smaller than a determination threshold set in advance.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of this disclosure will be described with reference to the drawings.

A configuration of a motor control device 100 according to the present embodiment will be described with reference to FIGS. 1 to 4. The motor control device 100 controls a motor 101 (an example of a "three-phase motor" in the claims) by vector control.

Configuration of Motor

Figure 1:
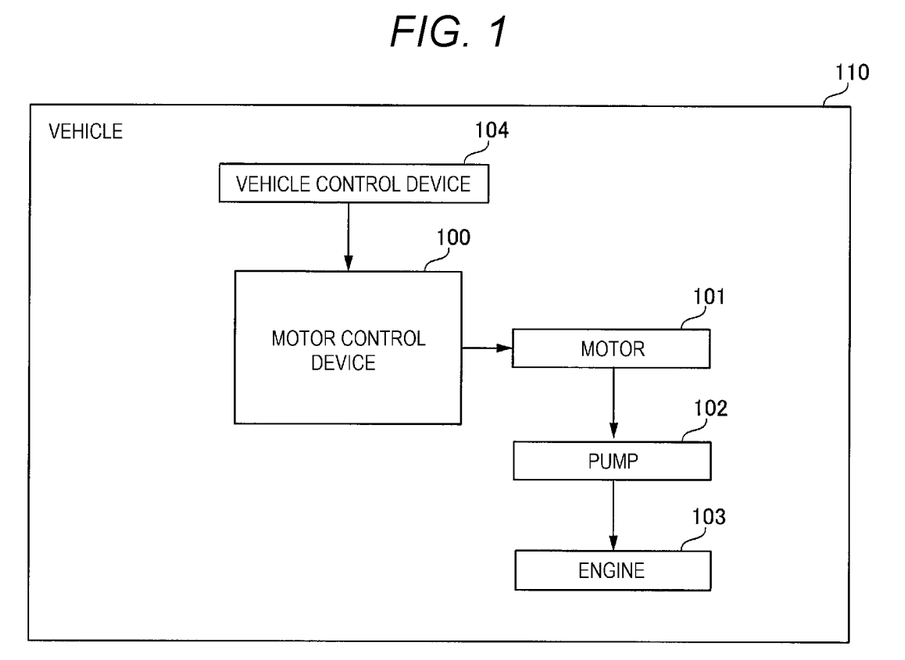
FIG. 1 is a block diagram showing an overall configuration of a vehicle according to an embodiment.

First, the motor 101 controlled by the motor control device 100 will be described with reference to FIG. 1. The motor 101 is a sensorless brushless motor. The motor 101 is provided with a permanent magnet (not shown). The motor 101 is, for example, an interior permanent magnet motor (IPM motor) in which a permanent magnet is embedded in a rotor, or a surface permanent magnet motor (SPM motor) in which a permanent magnet is disposed on a surface of a rotor.

The motor 101 is connected to a pump 102. The pump 102 is an electric water pump. The pump 102 is mounted on a vehicle 110 such as an automobile. The pump 102 supplies a cooling liquid (coolant liquid) to an engine 103 of the vehicle 110. That is, the motor 101 operates the pump 102 so as to supply the cooling liquid. The motor control device 100 controls a rotation speed of the motor 101 based on a speed command $\omega_{ref}$ (see FIG. 2) from a vehicle control device 104 (electronic control unit (ECU)) of the vehicle 110.

The vehicle control device 104 is, for example, a microcomputer (microcontroller) including a central processing unit (CPU), a random access memory (RAM), and a storage unit such as a flash memory. The vehicle control device 104 changes a flow rate of the cooling liquid supplied to the engine 103 based on a rotation speed, a temperature, and the like of the engine 103. Specifically, the vehicle control device 104 changes the flow rate of the cooling liquid by controlling the rotation speed of the motor 101 that operates the pump 102. Specifically, the vehicle control device 104 outputs the speed command $\omega_{ref}$ to the motor control device 100 in order to control the rotation speed of the motor 101.

Configuration of Motor Control Device

Next, a configuration of the motor control device 100 will be described with reference to FIGS. 2 to 4.

Figure 2:
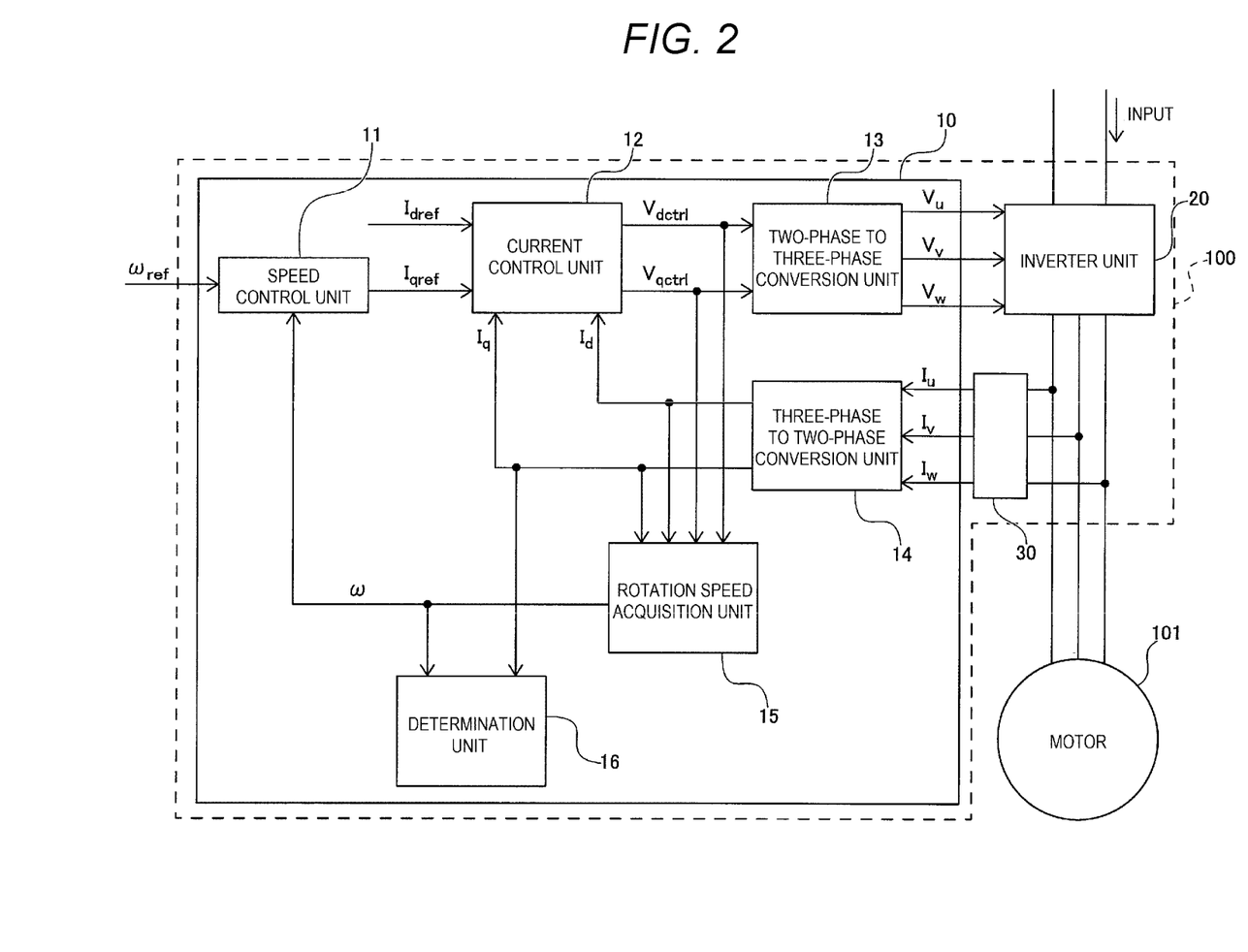
FIG. 2 is a block diagram showing an overall configuration of a motor control device according to the embodiment.

As shown in FIG. 2, the motor control device 100 includes a control unit 10, an inverter unit 20, and a current detection unit 30.

The inverter unit 20 converts DC power received from a battery (not shown) or the like into AC power. Then, the inverter unit 20 outputs the converted AC power to the motor 101. Specifically, based on a control signal from the control unit 10, a gate signal from a driver unit (not shown) is input to a gate terminal of a switching element provided in the inverter unit 20. The inverter unit 20 outputs three-phase AC power corresponding to the control signal to the motor 101 by controlling a switching operation of the switching element based on the input gate signal. The inverter unit 20 includes, for example, a three-phase two-level inverter circuit including six switching elements. The six switching elements are, for example, insulated gate bipolar transistors (IGBT).

The current detection unit 30 detects currents of the AC power output from the inverter unit 20 and input to the motor 101. Specifically, the current detection unit 30 detects each of the currents of the three-phase AC power input to the motor 101. The current detection unit 30 outputs, as a detection result, a U-phase current value $I_u$, a V-phase current value $I_v$, and a W-phase current value $I_w$ that respectively indicate currents of three phases of a U phase, a V phase, and a W phase to a three-phase to two-phase conversion unit 14, which will be described later, of the control unit 10. The current detection unit 30 includes, for example, a current transformer that detects a current. The current detection unit 30 further includes an amplifier that amplifies an acquired signal and an AD converter that converts the acquired signal into a digital signal.

The control unit 10 is, for example, a microcomputer including a CPU, a RAM, and a storage unit such as a flash memory. The control unit 10 controls each unit of the motor control device 100. Then, the control unit 10 controls driving of the motor 101. Specifically, the control unit 10 controls the AC power output to the motor 101 by controlling the switching operation of the switching elements provided in the inverter unit 20.

Specifically, the control unit 10 generates a pulse width modulation signal (PWM signal) for controlling the switching operation of the switching elements provided in the inverter unit 20 based on a U-phase voltage $V_u$, a V-phase voltage $V_v$, and a W-phase voltage $V_w$ that are calculated by a two-phase to three-phase conversion unit 13 to be described later. The control unit 10 controls the switching operation of the switching elements of the inverter unit 20 by outputting the generated PWM signal as the control signal to the driver unit (not shown). That is, the control unit 10 controls the switching operation of the switching elements of the inverter unit 20 by generating the PWM signal so as to output the three-phase AC power corresponding to the calculated U-phase voltage $V_u$, V-phase voltage $V_v$, and W-phase voltage $V_w$.

Configuration of Control Unit

The motor control device 100 according to the present embodiment executes the vector control on the driving of the motor 101 according to a d axis current command $I_{dref}$ and a q axis current command $I_{qref}$. In the vector control, feedback control is executed by executing coordinate conversion on a three-phase current (U-phase current value $I_u$, V-phase current value $I_v$, and W-phase current value $I_w$) of the motor 101 into vector components of a d axis, which is a direction of a magnetic field generated by a permanent magnet, and a q axis, which is a direction of torque orthogonal to the d axis. The control unit 10 acquires the speed command $\omega_{ref}$ from the vehicle control device 104 and drives the motor 101 at a rotation speed corresponding to the acquired speed command $\omega_{ref}$.

Specifically, the control unit 10 includes a speed control unit 11, a current control unit 12, the two-phase to three-phase conversion unit 13, the three-phase to two-phase conversion unit 14, a rotation speed acquisition unit 15, and a determination unit 16. The speed control unit 11, the current control unit 12, the two-phase to three-phase conversion unit 13, the three-phase to two-phase conversion unit 14, the rotation speed acquisition unit 15, and the determination unit 16 are provided as functional configurations (functional blocks) in the control unit 10. That is, the control unit 10 executes a function of each functional block by a CPU (processor) executing a program stored in a storage unit of the control unit 10 such as a flash memory. These functional blocks may be provided as processing circuits (hardware) that execute processing.

The speed command $\omega_{ref}$ from the vehicle control device 104 is input to the speed control unit 11. The speed control unit 11 receives a speed estimation value w calculated by the rotation speed acquisition unit 15 to be described later. Then, the speed control unit 11 calculates the q axis current command $I_{qref}$ based on the input speed command $\omega_{ref}$ and the speed estimation value $\omega$.

The d axis current command $I_{dref}$ is input to the current control unit 12. The d axis current command $I_{dref}$ is calculated based on, for example, the speed estimation value w acquired by the rotation speed acquisition unit 15 to be described later and the q axis current command $I_{qref}$ calculated by the speed control unit 11 such that torque of the motor 101 is maximized. The d axis current command $I_{dref}$ may be set to 0. The q axis current command $I_{qref}$ calculated by the speed control unit 11 is input to the current control unit 12. A d axis current value $I_d$ and a q axis current value $I_q$ that are calculated by the three-phase to two-phase conversion unit 14 to be described later are input to the current control unit 12. The current control unit 12 calculates a d axis control voltage $V_{dctrl}$ and a q axis control voltage $V_{qctrl}$ based on the d axis current command $I_{dref}$, the q axis current command $I_{qref}$, the d axis current value $I_d$, and the q axis current value $I_q$. Specifically, the current control unit 12 calculates the d axis control voltage $V_{dctrl}$ by executing the feedback control based on the d axis current command $I_{dref}$, which is a command value, and the d axis current value $I_d$, which is an actual measurement value. The current control unit 12 calculates the q axis control voltage $V_{qctrl}$ by executing the feedback control based on the q axis current command $I_{qref}$, which is a command value, and the q axis current value $I_q$, which is an actual measurement value.

The d axis control voltage $V_{dctrl}$ and the q axis control voltage $V_{qctrl}$ that are calculated by the current control unit 12 are input to the two-phase to three-phase conversion unit 13. Then, the two-phase to three-phase conversion unit 13 calculates the U-phase voltage $V_u$, the V-phase voltage $V_v$, and the W-phase voltage $V_w$ by executing inverse Park transformation and inverse Clarke transformation on the input d axis control voltage $V_{dctrl}$ and q axis control voltage $V_{qctrl}$. The two-phase to three-phase conversion unit 13 executes the inverse Park transformation using a rotation angle acquired from the rotation speed acquisition unit 15 to be described later.

The U-phase current value $I_u$, the V-phase current value $I_v$, and the W-phase current value $I_w$ that indicate the currents of the three phases (U phase, V phase, and W phase) detected by the current detection unit 30 are input to the three-phase to two-phase conversion unit 14. Then, the three-phase to two-phase conversion unit 14 acquires the d axis current value $I_d$ and the q axis current value $I_q$ by converting the three-phase current to be input to the motor 101 into a two-phase current. Specifically, the three-phase to two-phase conversion unit 14 calculates the d axis current value $I_d$ and the q axis current value $I_q$ by executing Clarke transformation and Park transformation on the received U-phase current value $I_u$, V-phase current value $I_v$, and W-phase current value $I_w$. The three-phase to two-phase conversion unit 14 executes the Park transformation using the rotation angle acquired from the rotation speed acquisition unit 15 to be described later.

The rotation speed acquisition unit 15 acquires the rotation speed of the motor 101. In the present embodiment, the rotation speed acquisition unit 15 estimates the rotation speed of the motor 101 by calculating the speed estimation value $\omega$. That is, the rotation speed acquisition unit 15 acquires the calculated speed estimation value $\omega$ as the rotation speed of the motor 101. Specifically, the rotation speed acquisition unit 15 acquires the d axis current value $I_d$ and the q axis current value $I_q$ that are acquired by the three-phase to two-phase conversion unit 14. The rotation speed acquisition unit 15 acquires the d axis control voltage $V_{dctrl}$ and the q axis control voltage $V_{qctrl}$ that are calculated by the current control unit 12. Then, the rotation speed acquisition unit 15 calculates the speed estimation value $\omega$ based on the acquired d axis current value $I_d$, q axis current value $I_q$, d axis control voltage $V_{dctrl}$, and q axis control voltage $V_{qctrl}$. In addition, the rotation speed acquisition unit 15 calculates a rotation angle of the motor 101 for the inverse Park transformation executed by the two-phase to three-phase conversion unit 13. In addition, the rotation speed acquisition unit 15 calculates the rotation angle of the motor 101 for the Park transformation executed by the three-phase to two-phase conversion unit 14.

Idling Determination

In the present embodiment, the motor control device 100 determines idling (no-load operation) of the motor 101 by the determination unit 16. That is, the motor control device 100 detects a shortage of the cooling liquid in the pump 102 (that the pump 102 is in an idling state) due to liquid leakage, evaporation, or the like of the cooling liquid.

As shown in FIG. 2, the determination unit 16 acquires the q axis current value $I_q$ acquired by the three-phase to two-phase conversion unit 14. In addition, the determination unit 16 acquires the speed estimation value $\omega$ acquired by the rotation speed acquisition unit 15. In the present embodiment, the determination unit 16 determines that the motor 101 is idling when the q axis current value $I_q$ acquired by the three-phase to two-phase conversion unit 14 is equal to or smaller than a determination threshold S set in advance (see FIG. 3).

Figure 3:
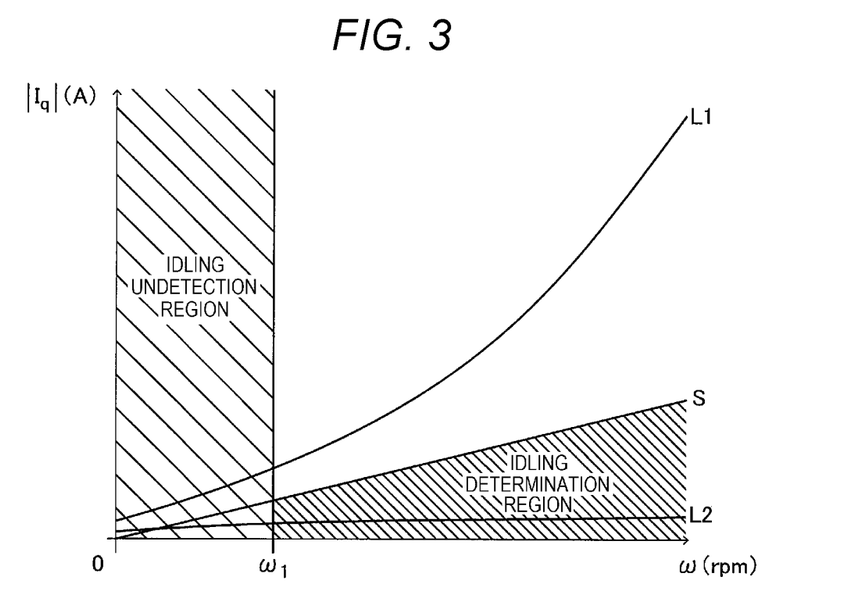
FIG. 3 is a diagram showing a relationship between a determination threshold and a speed estimation value according to the embodiment.

As shown in FIG. 3, in the present embodiment, the determination threshold S is set in advance so as to increase as the rotation speed of the motor 101 increases. Specifically, the determination threshold S is set in advance so as to increase in proportion to an increase in the rotation speed. The determination threshold S is stored in advance in the storage unit of the control unit 10. The determination unit 16 determines that the motor 101 is idling when the acquired q axis current value $I_q$ is equal to or smaller than the determination threshold S at the rotation speed corresponding to the acquired speed estimation value $\omega$.

A solid line L1 in FIG. 3 shows an example of a relationship between the q axis current value $I_q$ (an absolute value of the q axis current value $I_q$) of the motor 101 in a normal state that is not an idling state (no-load operation state) and the rotation speed (speed estimation value $\omega$). A solid line L2 in FIG. 3 shows an example of a relationship between the q axis current value $I_q$ (the absolute value of the q axis current value $I_q$) of the motor 101 in the idling state and the rotation speed (speed estimation value $\omega$). When the motor 101 is in the normal state, the acquired q axis current value $I_q$ (the absolute value of the q axis current value $I_q$) is larger than the determination threshold S. On the other hand, when the motor 101 is in the idling state, the acquired q axis current value $I_q$ (the absolute value of the q axis current value $I_q$) is equal to or smaller than the determination threshold S.

Idling Undetection Region

In the present embodiment, the determination unit 16 (control unit 10) does not determine idling of the motor 101 when the rotation speed (speed estimation value $\omega$) acquired by the rotation speed acquisition unit 15 is smaller than a predetermined minimum rotation speed $\omega_1$, but determines the idling of the motor 101 when the rotation speed (speed estimation value $\omega$) is equal to or larger than the minimum rotation speed $\omega_1$. Specifically, the control unit 10 stores the minimum rotation speed $\omega_1$ set in advance. The minimum rotation speed $\omega_1$ is set based on, for example, the rotation speed (speed estimation value $\omega$) at which a difference between the q axis current value $I_q$ in the normal state and the q axis current value $I_q$ in the idling state is smaller than a predetermined value. For example, when the rotation speed of the motor 101 is controllable in a range of 0 revolutions per minute (rpm) or more and 6000 rpm or less, 2000 rpm is set as the minimum rotation speed $\omega_1$.

Fail Control

Figure 4:
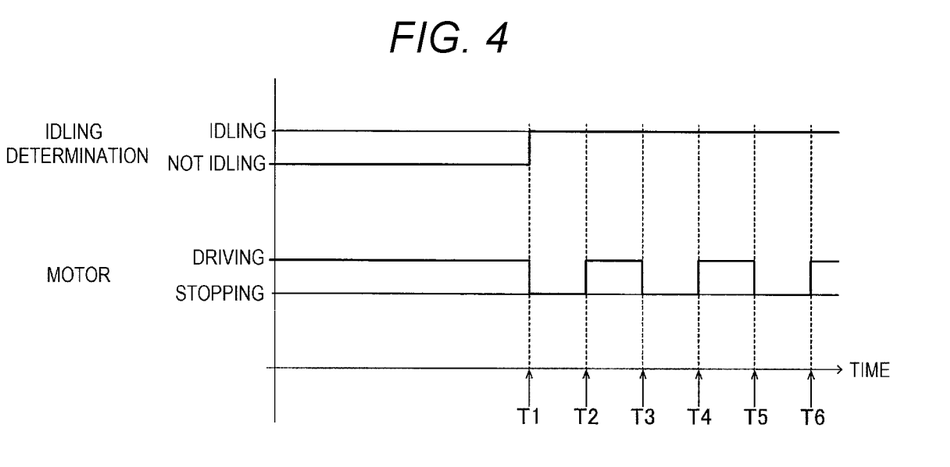
FIG. 4 is a diagram showing fail control according to the embodiment.

As shown in FIG. 4, when it is determined that the motor 101 is idling, the control unit 10 executes fail control for intermittently driving the motor 101. That is, the control unit 10 controls the inverter unit 20 so as to alternately repeat driving and stopping of the motor 101 when it is determined that the motor 101 is idling.

For example, when the determination unit 16 determines that the motor 101 is idling at a time point T1 in FIG. 4, the control unit 10 controls the inverter unit 20 so as to repeat the driving and stopping of the motor 101 at a predetermined interval (for example, one second). In this case, the motor 101 is stopped during one second from the time point T1 to a time point T2 in FIG. 4. Then, the motor 101 is driven during one second from the time point T2 to a time point T3. The same operations are repeated at time points T4, T5, T6, . . . after the time point T3. The control unit 10 executes the fail control as described above during a period in which the determination unit 16 acquires idling determination.

Here, in the pump 102 for supplying the cooling liquid, air (gas) is contained in a part of the cooling liquid, and thus an idling phenomenon called air entrainment may occur. The control unit 10 eliminates the idling due to the air entrainment by repeating the driving and stopping of the motor 101 as in the fail control described above. In a state in which the idling is detected by the determination unit 16, when the idling is not detected due to elimination of the air entrainment or the like, the control unit 10 ends the fail control and drives the motor 101 again as usual.

When it is determined that the motor 101 is idling, the control unit 10 outputs information indicating the idling to the vehicle control device 104. The vehicle control device 104 causes a display device (not shown) to display information indicating the idling (idling of the pump 102) of the motor 101 based on the information indicating the idling from the control unit 10. In addition, the vehicle control device 104 may output a command to stop the driving of the motor 101 based on the information indicating the idling from the control unit 10, or may continue the fail control.

Motor Control Method according to Present Embodiment

Figure 5:
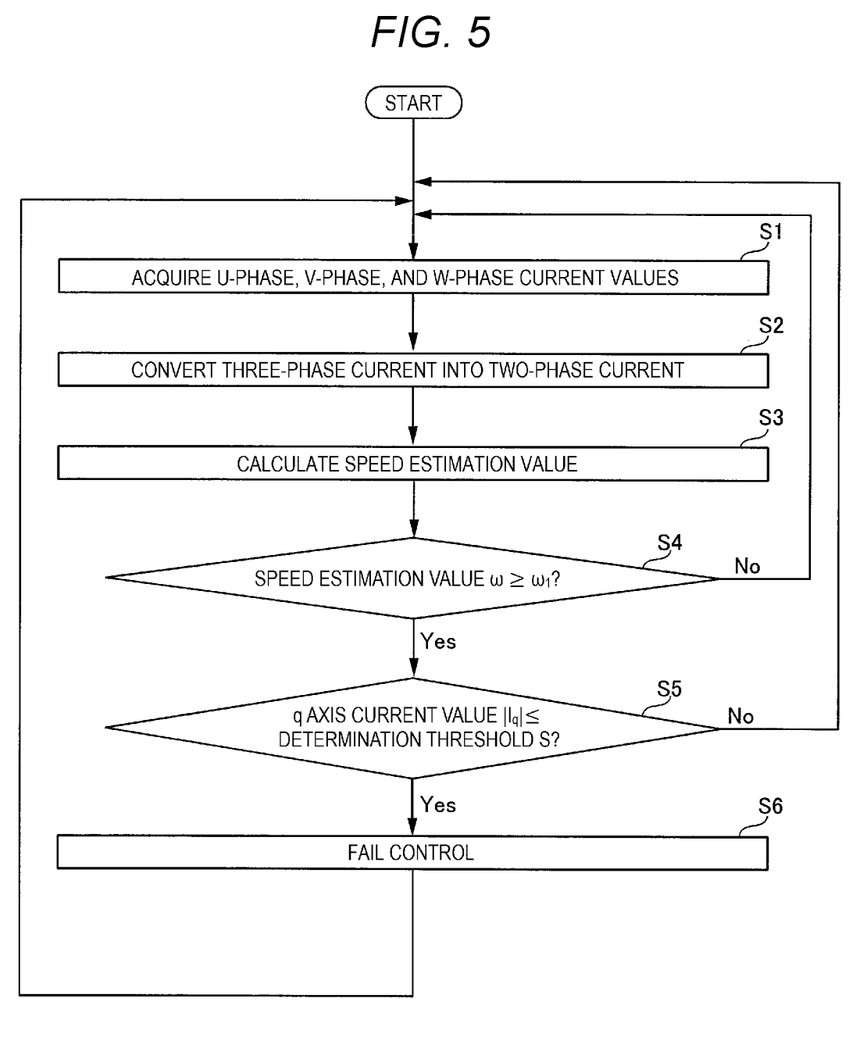
FIG. 5 is a flowchart showing control processing of a motor control method according to an embodiment.

Hereinafter, control processing of a motor control method in the idling determination by the control unit 10 will be described with reference to FIG. 5. The motor control method according to the present embodiment is a motor control method in which the driving of the motor 101 is subjected to the vector control according to the d axis current command $I_{dref}$ and the q axis current command $I_{qref}$.

First, in step S1, a current input to the motor 101 is detected. Specifically, the U-phase current value the V-phase current value $I_v$, and the W-phase current value $I_w$ of the motor 101 detected by the current detection unit 30 are acquired.

Next, in step S2, a three-phase current (U-phase current value $I_u$, V-phase current value $I_v$, and W-phase current value $I_w$) input to the motor 101 is converted into a two-phase current, whereby the d axis current value $I_d$ and the q axis current value $I_q$ are acquired. Specifically, the three-phase to two-phase conversion unit 14 calculates the d axis current value $I_d$ and the q axis current value $I_q$ by executing Clarke transformation and Park transformation on the acquired U-phase current value $I_u$, V-phase current value $I_v$, and W-phase current value $I_w$.

Next, in step S3, the rotation speed of the motor 101 is acquired. Specifically, the rotation speed acquisition unit 15 calculates the speed estimation value ω based on the acquired d axis current value $I_d$, q axis current value $I_q$, d axis control voltage $V_{dctrl}$, and q axis control voltage $V_{qctrl}$.

Next, in step S4, it is determined whether the calculated speed estimation value ω is equal to or larger than the minimum rotation speed $ω_1$ set in advance. When it is determined that the speed estimation value ω is equal to or larger than the minimum rotation speed $ω_1$, the processing proceeds to step S5. When it is determined that the speed estimation value ω is smaller than the minimum rotation speed $ω_1$, the idling determination is not executed, and the processing returns to step S1.

In step S5, it is determined whether the q axis current value $I_q$ calculated in step S2 is equal to or smaller than the determination threshold S set in advance. Specifically, the determination threshold S is set in advance so as to increase as the rotation speed (speed estimation value ω) of the motor 101 increases. Then, it is determined whether the absolute value of the acquired q axis current value $I_q$ is equal to or smaller than the determination threshold S in the acquired speed estimation value ω. When it is determined that the q axis current value $I_q$ is equal to or smaller than the determination threshold S, it is determined that the motor 101 is idling, and the processing proceeds to step S6. When it is determined that the q axis current value $I_q$ is larger than the determination threshold S, the processing returns to step S1.

In step S6, based on the determination that the motor 101 is idling, the fail control is executed in which the driving and stopping of the motor 101 are repeated. When it is determined that the motor 101 is idling, the fail control is continued. When it is determined that the motor 101 is not idling, the fail control is ended.

The control processing described above is continuously executed from a time point at which the driving of the motor 101 is started to a time point at which the driving of the motor 101 is ended.

Effects of Present Embodiment

In the present embodiment, the following effects can be attained.

In the present embodiment, as described above, when the q axis current value $I_q$ is equal to or smaller than the determination threshold S set in advance, it is determined that the motor 101 (three-phase motor) is idling. Here, the q axis current value $I_q$ used for executing the vector control on the driving of the motor 101 is a current value that indicates vector components in the direction of the torque for rotating the motor 101 among the currents input to the motor 101. Since this q axis current value $I_q$ is not affected by a power supply voltage, the acquired q axis current value $I_q$ does not decrease even when the power supply voltage is large. Therefore, by determining that the motor 101 is idling when the q axis current value $I_q$ is equal to or smaller than the determination threshold S set in advance, it is possible to accurately determine the idling of the motor 101 even when the power supply voltage is large. In addition, since the idling of the motor 101 can be determined based on the q axis current value $I_q$ calculated when the vector control is executed on the driving of the motor 101, the idling of the motor 101 can be easily determined without providing a new configuration. In the vector control, the q axis current value $I_q$ is calculated as a DC current. Therefore, a processing load required for arithmetic processing can be reduced as compared with a case in which an AC current to be input to the motor 101 is directly used to determine the idling of the motor 101.

In the present embodiment, as described above, the determination unit 16 determines that the motor 101 (three-phase motor) is idling when the q axis current value $I_q$ is equal to or smaller than the determination threshold S based on the determination threshold S set in advance so as to increase as the rotation speed (speed estimation value ω) of the motor 101 increases. Accordingly, since the q axis current value $I_q$ for executing the vector control on the motor 101 increases as the rotation speed of the motor 101 increases, the idling of the motor 101 can be detected more accurately by setting the determination threshold S for idling determination in advance such that the determination threshold S increases as the rotation speed of the motor 101 increases.

In the present embodiment, as described above, the control unit 10 includes the rotation speed acquisition unit 15 that acquires the rotation speed of the motor 101 (three-phase motor). The determination unit 16 does not determine the idling of the motor 101 when the rotation speed (speed estimation value ω) acquired by the rotation speed acquisition unit 15 is smaller than the predetermined minimum rotation speed $ω_1$, but determines the idling of the motor 101 when the speed estimation value ω is equal to or larger than the minimum rotation speed $ω_1$. Here, when the rotation speed of the motor 101 is small, a difference between the q axis current value $I_q$ acquired in a state (normal state) in which a load is applied to the motor 101 and the q axis current value $I_q$ acquired in a state in which the motor 101 is idling is small. Therefore, when the rotation speed of the motor 101 is small, it is considered that the idling of the motor 101 is difficult to be determined based on the determination threshold S set in advance. In consideration of this case, in the present embodiment, the determination unit 16 does not determine the idling of the motor 101 when the rotation speed (speed estimation value ω) acquired by the rotation speed acquisition unit 15 is smaller than the predetermined minimum rotation speed $\omega_1$, but determines the idling of the motor 101 when the rotation speed is equal to or larger than the minimum rotation speed $\omega_1$. According to this configuration, when the rotation speed of the motor 101 is small, the determination of the idling of the motor 101 is not executed, and thus it is possible to prevent erroneous determination of idling of the motor 101.

Effects of Motor Control Method according to Present Embodiment

In the motor control method according to the present embodiment, the following effects can be attained.

In the motor control method according to the present embodiment, with the configuration described above, when the q axis current value $I_q$ is equal to or smaller than the determination threshold S set in advance, it is determined that the motor 101 (three-phase motor) is idling. Here, the q axis current value $I_q$ used for executing the vector control on the driving of the motor 101 is a current value that indicates the vector components in the direction of the torque for rotating the motor 101 among the currents input to the motor 101. Since this q axis current value $I_q$ is not affected by the power supply voltage, the acquired q axis current value $I_q$ does not decrease even when the power supply voltage is large. Therefore, by determining that the motor 101 is idling when the q axis current value $I_q$ is equal to or smaller than the determination threshold S set in advance, it is possible to provide a motor control method that allows accurate determination of idling of the motor 101 even when the power supply voltage is large. In addition, since the idling of the motor 101 can be determined based on the q axis current value $I_q$ calculated when the vector control is executed on the driving of the motor 101, it is possible to provide a motor control method that allows easy determination of idling of the motor 101 without providing a new configuration. In the vector control, the q axis current value $I_q$ is calculated as a DC current. Therefore, it is possible to provide a motor control method that allows reduction in the processing load required for the arithmetic processing as compared with the case in which the AC current input to the motor 101 is directly used to determine the idling of the motor 101.

In the motor control method according to the present embodiment, as described above, in step S5 of determining that the motor 101 (three-phase motor) is idling, it is determined, based on the determination threshold S set in advance so as to increase as the rotation speed (speed estimation value ω) of the motor 101 increases, that the motor 101 is idling when the q axis current value $I_q$ is equal to or smaller than the determination threshold S. Accordingly, since the q axis current value $I_q$ for executing the vector control on the motor 101 increases as the rotation speed of the motor 101 increases, it is possible to provide a motor control method that allows more accurate detection of the idling of the motor 101 by setting the determination threshold S for idling determination in advance such that the determination threshold S increases as the rotation speed of the motor 101 increases.

Modification

It should be understood that the above embodiment disclosed here is illustrative in all respects and is not restrictive. The scope of this disclosure is shown according to the claims rather than the description of the above embodiment, and further includes all changes (modifications) within the meaning and the scope equivalent to the claims.

Figure 6:
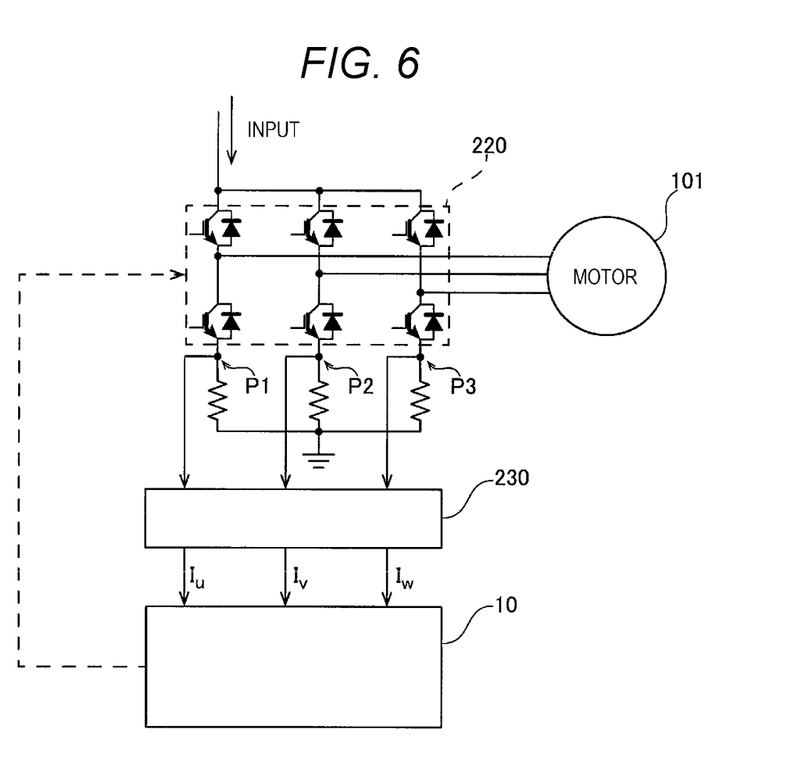
FIG. 6 is a diagram showing detection of a current input to a motor of a current detection unit according to a modification of the embodiment.

For example, in the above embodiment, an example is described in which the current detection unit 30 detects a current input to each of the three phases (U phase, V phase, and W phase) of the motor 101 using the current transformer between the inverter unit 20 and the motor 101, but this disclosure is not limited thereto. In this disclosure, as in a current detection unit 230 according to a modification shown in FIG. 6, currents that are input to the motor 101 from a terminal P1, a terminal P2, and a terminal P3 provided on negative sides of three switching elements on a lower arm side among six switching elements provided in an inverter unit 220 may be detected. In this case, the current detection unit 230 includes, for example, an amplifier (operational amplifier).

In the above embodiment, an example is described in which the determination threshold S is set in advance so as to increase as the rotation speed (speed estimation value ω) increases, but this disclosure is not limited thereto. For example, the determination threshold S may be set as a constant value regardless of the rotation speed (speed estimation value ω) of the motor 101.

In the above embodiment, an example is described in which the idling of the motor 101 is not determined when the rotation speed (speed estimation value ω) is smaller than the predetermined minimum rotation speed $\omega_1$, but this disclosure is not limited thereto. For example, the idling determination may be executed in an entire operable speed range without setting the minimum rotation speed $\omega_1$.

In the above embodiment, an example is described in which the motor 101 is a sensorless brushless motor, but this disclosure is not limited thereto. For example, the rotation speed or the rotation angle of the motor 101 may be detected by providing an angle sensor such as a Hall element in the motor 101. In this case, the rotation speed acquisition unit 15 (control unit 10) acquires the rotation speed and the rotation angle that are detected by the angle sensor without estimating the rotation speed.

In the above embodiment, an example is described in which the motor 101 is mounted on the vehicle 110 and operates the pump 102 that supplies a cooling liquid to the engine 103, but this disclosure is not limited thereto. For example, a pump that supplies a cooling liquid to a power supply device such as a battery instead of the engine 103 may be operated. A motor may be provided in a shift device of a vehicle, and may drive a shift member.

In the above embodiment, an example is described in which the control unit 10 controls driving of the motor 101 based on the speed command $\omega_{ref}$ from the vehicle control device 104 different from the control unit 10 that controls the driving of the motor 101, but this disclosure is not limited thereto. For example, the speed command $\omega_{ref}$ may be acquired by the control unit 10 that controls the driving of the motor 101.

According to a first aspect of this disclosure, a motor control device configured to execute vector control on driving of a three-phase motor according to a d axis current command and a q axis current command includes: a current detection unit configured to detect a current to be input to the three-phase motor; and a control unit configured to control driving of the three-phase motor. The control unit includes: a three-phase to two-phase conversion unit configured to acquire a q axis current value by converting a three-phase current input to the three-phase motor and detected by the current detection unit into a two-phase current; and a determination unit configured to determine that the three-phase motor is idling when the q axis current value is equal to or smaller than a determination threshold set in advance. The term "idling" as used herein means driving of the three-phase motor in a no-load operation state.

In the motor control device according to the first aspect of this disclosure, as described above, it is determined that the three-phase motor is idling when the q axis current value is equal to or smaller than the determination threshold set in advance. Here, the q axis current value used for executing vector control on the driving of the three-phase motor is a current value that indicates vector components in a direction of torque for rotating the three-phase motor among currents to be input to the three-phase motor. Since this q axis current value is not affected by the power supply voltage, the acquired q axis current value does not decrease even when the power supply voltage is large. Therefore, by determining that the three-phase motor is idling when the q axis current value is equal to or smaller than the determination threshold set in advance, it is possible to accurately determine the idling of the three-phase motor even when the power supply voltage is large. In addition, since the idling of the three-phase motor can be determined based on the q axis current value calculated when the vector control is executed on the driving of the three-phase motor, the idling of the three-phase motor can be easily determined without providing a new configuration. In the vector control, the q axis current value is calculated as a DC current. Therefore, a processing load required for arithmetic processing can be reduced as compared with a case in which an AC current to be input to the three-phase motor is directly used to determine the idling of the three-phase motor.

Preferably, in the motor control device according to the first aspect as described above, the determination unit is configured to determine, based on the determination threshold set in advance so as to increase as a rotation speed of the three-phase motor increases, that the three-phase motor is idling when the q axis current value is equal to or smaller than the determination threshold.

According to this configuration, since the q axis current value for executing the vector control on the three-phase motor increases as the rotation speed of the three-phase motor increases, it is possible to detect the idling of the three-phase motor more accurately by setting the determination threshold for idling determination in advance such that the determination threshold increases as the rotation speed of the three-phase motor increases.

Preferably, in the motor control device according to the first aspect as described above, the control unit further includes a rotation speed acquisition unit configured to acquire the rotation speed of the three-phase motor, and the determination unit is configured not to determine the idling of the three-phase motor when the rotation speed acquired by the rotation speed acquisition unit is smaller than a predetermined minimum rotation speed, but to determine idling of the three-phase motor when the rotation speed is equal to or larger than the minimum rotation speed.

Here, when the rotation speed of the three-phase motor is small, a difference between a q axis current value acquired in a state (normal state) in which a load is applied to the three-phase motor and a q axis current value acquired in a state in which the three-phase motor is idling is small. Therefore, when the rotation speed of the three-phase motor is small, it is considered that the idling of the three-phase motor is difficult to be determined based on the determination threshold set in advance. In consideration of this case, in this disclosure, the determination unit does not determine the idling of the three-phase motor when the rotation speed acquired by the rotation speed acquisition unit is smaller than the predetermined minimum rotation speed, but determines the idling of the three-phase motor when the rotation speed is equal to or larger than the minimum rotation speed. According to this configuration, when the rotation speed of the three-phase motor is small, the determination of the idling of the three-phase motor is not executed, and thus it is possible to prevent erroneous determination of idling of the three-phase motor.

According to a second aspect of this disclosure, a motor control method for executing vector control on driving of a three-phase motor according to a d axis current command and a q axis current command includes: a step of detecting a current to be input to the three-phase motor; a step of acquiring a q axis current value by converting a three-phase current to be input to the three-phase motor into a two-phase current; and a step of determining that the three-phase motor is idling when the q axis current value is equal to or smaller than a determination threshold set in advance.

In the motor control method according to the second aspect of this disclosure, as described above, it is determined that the three-phase motor is idling when the q axis current value is equal to or smaller than the determination threshold set in advance. Here, the q axis current value used for executing the vector control on the driving of the three-phase motor is a current value that indicates vector components in a direction of torque for rotating the three-phase motor among currents to be input to the three-phase motor. Since this q axis current value is not affected by a power supply voltage, the acquired q axis current value does not decrease even when the power supply voltage is large. Therefore, by determining that the three-phase motor is idling when the q axis current value is equal to or less than the determination threshold set in advance, it is possible to provide a motor control method that allows accurate determination of idling of the three-phase motor even when the power supply voltage is large. In addition, since the idling of the three-phase motor can be determined based on the q axis current value calculated when the vector control is executed on the driving of the three-phase motor, it is possible to provide a motor control method that allows easy determination of idling of the three-phase motor without providing a new configuration. In the vector control, the q axis current value is calculated as a DC current. Therefore, it is possible to provide a motor control method that allows reduction in a processing load required for arithmetic processing as compared with a case in which an AC current to be input to the three-phase motor is directly used to determine the idling of the three-phase motor.

Preferably, in the motor control method according to the second aspect as described above, the step of determining that the three-phase motor is idling includes a step of determining, based on the determination threshold set in advance so as to increase as a rotation speed of the three-phase motor increases, that the three-phase motor is idling when the q axis current value is equal to or smaller than the determination threshold.

According to this configuration, since the q axis current value for executing the vector control on the three-phase motor increases as the rotation speed of the three-phase motor increases, it is possible to provide a motor control method that allows more accurate detection of the idling of the three-phase motor by setting the determination threshold for idling determination in advance such that the determination threshold increases as the rotation speed of the three-phase motor increases.

In the motor control device according to the first aspect as described above, the following configuration may also be considered.

Appendix 1

That is, the determination unit is configured to determine that the three-phase motor connected to a pump is idling.

According to this configuration, it is possible to easily determine idling of the pump by determining whether the q axis current value of the three-phase motor connected to the pump is equal to or smaller than the determination threshold set in advance. Therefore, it is possible to easily determine whether discharge or suction of a liquid is normally performed by the pump.

Appendix 2

In the motor control device configured to determine that the three-phase motor is idling based on the determination threshold set in advance so as to increase as the rotation speed of the three-phase motor increases, the determination unit is configured to determine, based on the determination threshold set in advance so as to increase in proportion to an increase in the rotation speed, that the three-phase motor is idling when the q axis current value is equal to or smaller than the determination threshold.

According to this configuration, since the determination threshold is set to increase in proportion to the rotation speed, the determination threshold at a current rotation speed can be acquired without executing complicated arithmetic processing. Therefore, it is possible to more easily execute the arithmetic processing for idling determination using the determination threshold.

Appendix 3

In the above motor control device configured to determine that the three-phase motor is idling based on the determination threshold set in advance so as to increase as the rotation speed of the three-phase motor increases, the control unit further includes the rotation speed acquisition unit configured to acquire the rotation speed of the three-phase motor, the three-phase to two-phase conversion unit is configured to acquire a d axis current value in addition to the q axis current value by converting the three-phase current to be input to the three-phase motor into a two-phase current, and the rotation speed acquisition unit is configured to estimate the rotation speed of the three-phase motor based on a d axis control voltage calculated based on the d axis current command, a q axis control voltage calculated based on the q axis current command, the q axis current value, and the d axis current value.

According to this configuration, the rotation speed of the three-phase motor can be estimated based on the acquired d axis control voltage, q axis control voltage, q axis current value, and d axis current value without providing an angle sensor or the like. Therefore, it is possible to prevent the device from having a complicated configuration in order to measure the rotation speed of the three-phase motor. As a result, even when the idling is determined, the determination threshold and the q axis current value can be compared based on the estimated rotation speed, and thus the idling can be accurately determined without complicating the device configuration.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A motor control device configured to execute vector control on driving of a three-phase motor according to a d axis current command and a q axis current command, the motor control device comprising:
    a current detector configured to detect a current to be input to the three-phase motor; and
    a controller configured to control driving of the three-phase motor, wherein
    the controller includes:
        a three-phase to two-phase conversion unit configured to acquire a q axis current value by converting a three-phase current input to the three-phase motor and detected by the current detector into a two-phase current; and
        a determiner configured to determine that the three-phase motor is idling when the q axis current value is equal to or smaller than a determination threshold set in advance,
    wherein the idling is a condition where the three-phase motor is under a no load condition,
    wherein the determiner is configured to determine, based on the determination threshold set in advance so as to increase as a rotation speed of the three-phase motor increases, that the three-phase motor is idling when the q axis current value is equal to or smaller than the determination threshold.

2. The motor control device according to claim 1, wherein the determiner is configured to determine, based on the determination threshold set in advance so as to increase in proportion to an increase in the rotation speed of the three-phase motor, that the three-phase motor is idling when the q axis current value is equal to or smaller than the determination threshold.

3. The motor control device according to claim 1, wherein the controller further includes a rotation speed acquisition unit configured to acquire the rotation speed of the three-phase motor, and
the determiner is configured not to determine idling of the three-phase motor when the rotation speed acquired by the rotation speed acquisition unit is smaller than a predetermined minimum rotation speed, but to determine idling of the three-phase motor when the rotation speed is equal to or larger than the minimum rotation speed.

4. The motor control device according to claim 3, wherein the three-phase to two-phase conversion unit is configured to acquire a d axis current value in addition to the q axis current value by converting the three-phase current to be input to the three-phase motor into a two-phase current, and
the rotation speed acquisition unit is configured to estimate the rotation speed of the three-phase motor based on a d axis control voltage calculated based on the d axis current command, a q axis control voltage calculated based on the q axis current command, the q axis current value, and the d axis current value.

5. The motor control device according to claim 1, wherein the determiner is configured to determine that the three-phase motor connected to a pump is idling.

6. A motor control method for executing vector control on driving of a three-phase motor according to a d axis current command and a q axis current command, the motor control method comprising:

a step of detecting a current to be input to the three-phase motor;

a step of acquiring a q axis current value by converting a three-phase current to be input to the three-phase motor into a two-phase current; and a step of determining that the three-phase motor is idling when the q axis current value is equal to or smaller than a determination threshold set in advance, wherein the idling is a condition where the three-phase motor is under a no load condition, wherein the step of determining that the three-phase motor is idling includes a step of determining, based on the determination threshold set in advance so as to increase as a rotation speed of the three-phase motor increases, that the three-phase motor is idling when the q axis current value is equal to or smaller than the determination threshold.

* * * * *